US012679333B2

(12) United States Patent
Diamond et al.

(10) Patent No.: US 12,679,333 B2
(45) Date of Patent: Jul. 14, 2026

(54) SYSTEM AND METHOD FOR ENGINE STARTING ADAPTATION

(71) Applicant: Ford Global Technologies, LLC, Dearborn, MI (US)

(72) Inventors: Brendan Diamond, Grosse Pointe, MI (US); Shunsuke Okubo, Belleville, MI (US); David Warm, Clinton Township, MI (US); Gregory Michael Ostroski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 18/530,051

(22) Filed: Dec. 5, 2023

(65) Prior Publication Data

US 2025/0178589 A1     Jun. 5, 2025

(51) Int. Cl.
*B60W 20/40*          (2016.01)
*B60W 10/06*          (2006.01)
*B60W 10/26*          (2006.01)

(52) U.S. Cl.
CPC ............ *B60W 20/40* (2013.01); *B60W 10/06* (2013.01); *B60W 10/26* (2013.01); *B60W 2710/0666* (2013.01)

(58) Field of Classification Search
CPC ...... B60W 20/40; B60W 10/06; B60W 10/26; B60W 2710/0666; B60W 2540/10; B60W 2540/30; B60W 2556/10; B60W 10/08; F02N 11/08; F02N 11/0803; F02N 11/0862
See application file for complete search history.

(56) References Cited

U.S. PATENT DOCUMENTS

| | | | |
|---|---|---|---|
| 8,935,075 B2 | 1/2015 | Otanez et al. | |
| 10,252,712 B2 | 4/2019 | Ossarech et al. | |
| 10,858,004 B2 | 12/2020 | Awadi et al. | |
| 11,542,904 B2 | 1/2023 | Lerner et al. | |
| 2019/0071087 A1* | 3/2019 | Virgen | B60W 30/18018 |
| 2020/0031371 A1* | 1/2020 | Soliman | B60W 10/04 |
| 2023/0182711 A1* | 6/2023 | Ravichandran | B60W 10/02 477/5 |

* cited by examiner

*Primary Examiner* — Joseph J Dallo
(74) *Attorney, Agent, or Firm* — McCoy Russell LLP

(57) ABSTRACT

Methods and systems for adapting engine starting thresholds for automatic engine starting are described. In one example, one or more automatic engine starting thresholds may be adjusted to decrease a possibility of automatic engine starting. The automatic engine starting thresholds may be adjusted based on engine starts being characterized as low benefit engine starts.

18 Claims, 6 Drawing Sheets

400 →

SYSTEM AND METHOD FOR ENGINE STARTING ADAPTATION

FIELD

The present description relates generally to a system and method for starting an internal combustion engine of a vehicle.

BACKGROUND/SUMMARY

A hybrid vehicle may operate at times solely under electric propulsive power. Electric power provides an opportunity to conserve gasoline or diesel fuel and reduce vehicle emissions. However, electric propulsion may be replaced by or augmented by power generated via an internal combustion engine. If the engine is started and the engine does not remain started for a threshold amount of time, it may be deemed that the engine start is a low benefit engine start. It may be desirable to reduce the possibility of generating low benefit engine starts.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
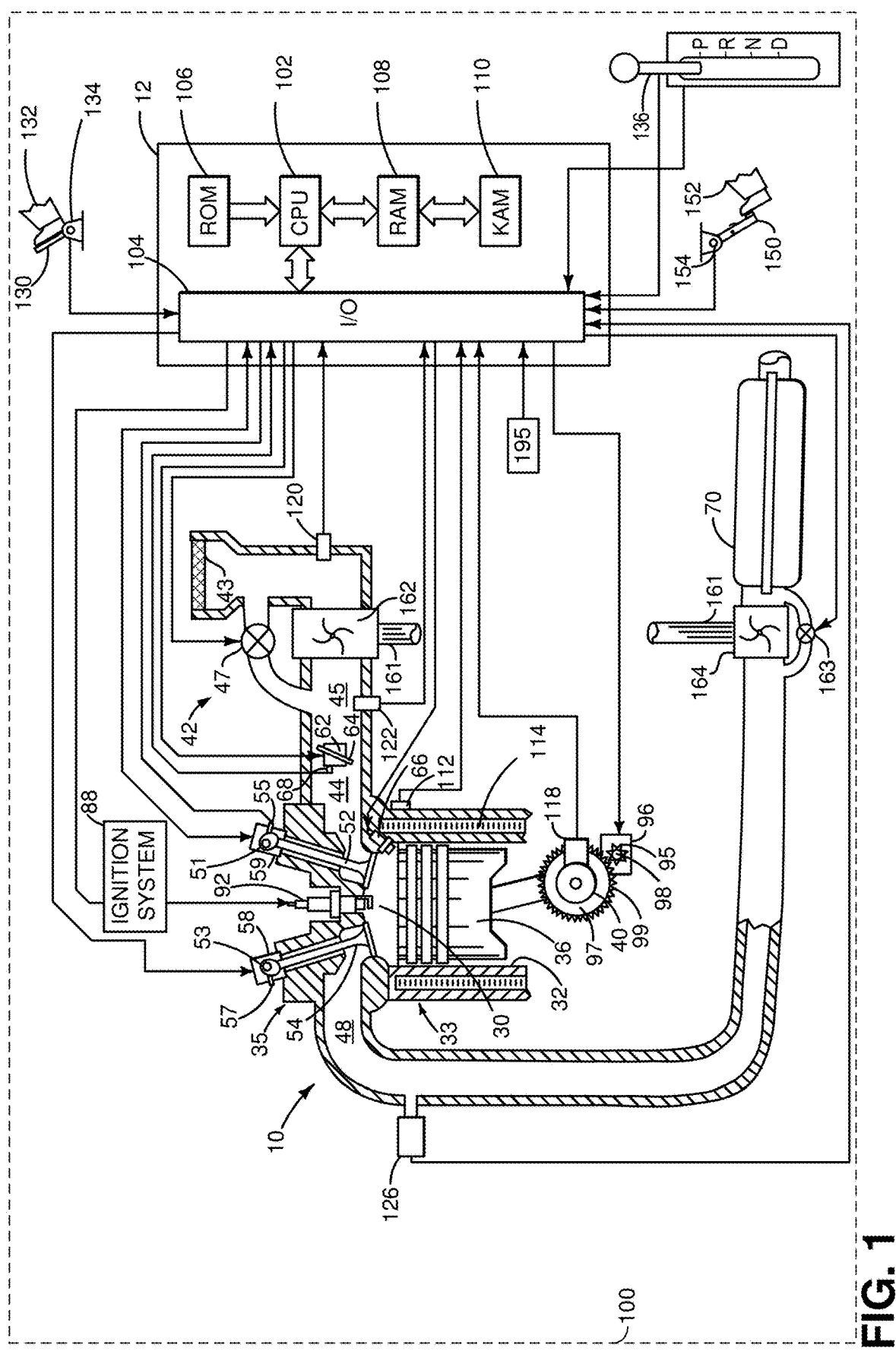
FIG. 1 is a schematic diagram of an engine system for a hybrid vehicle system.
Figure 2:
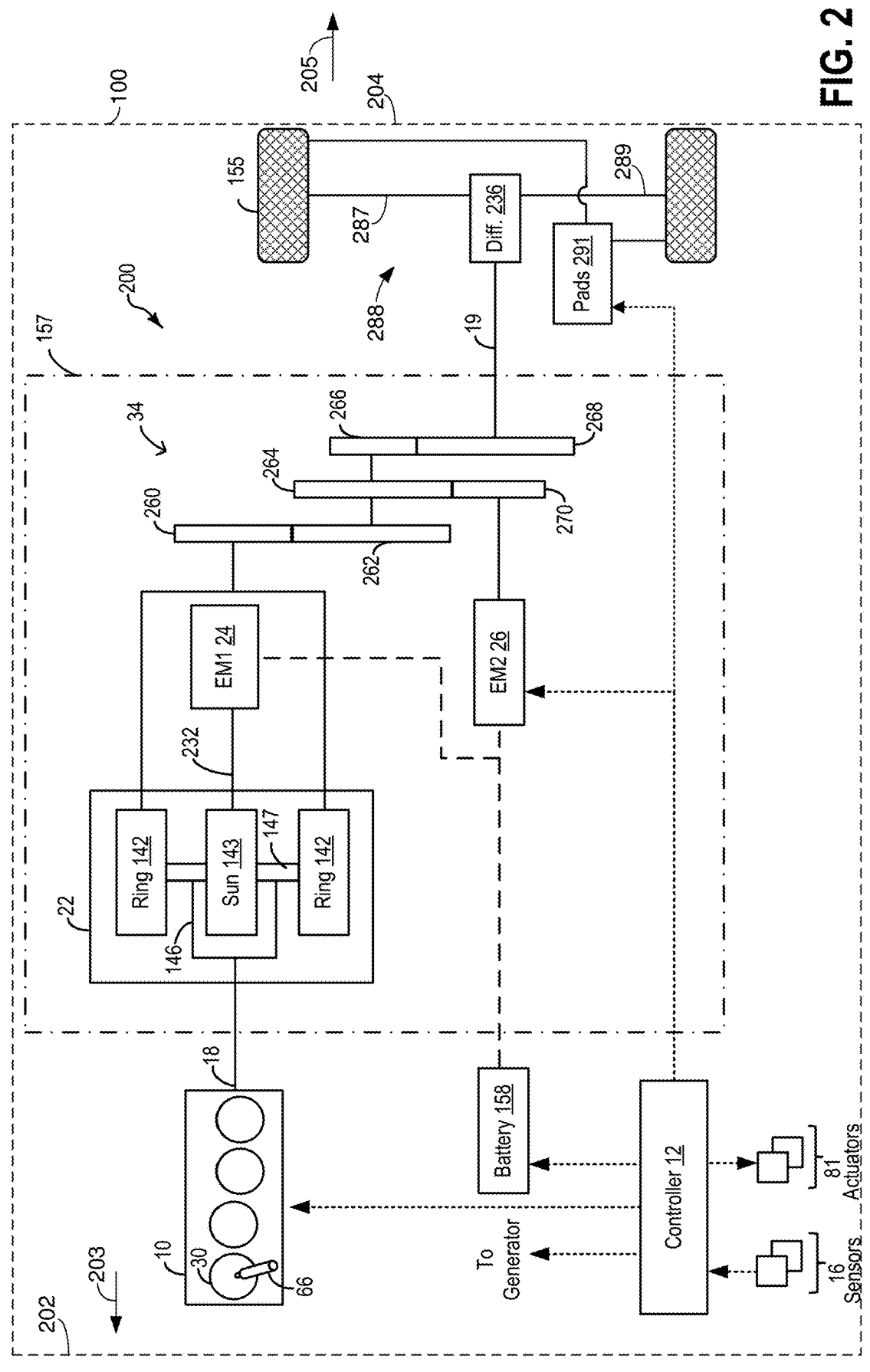
FIG. 2 shows an example powertrain of a hybrid vehicle.
Figure 3:
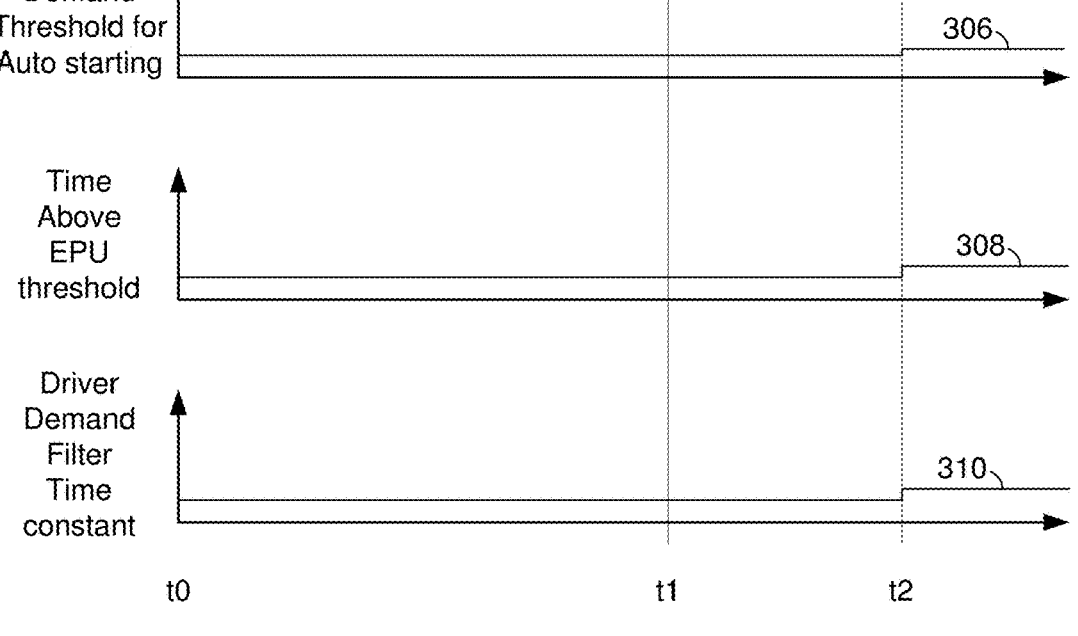
FIG. 3 shows an example sequence for operating a hybrid vehicle.

The following description relates to systems and methods for adapting conditions for automatically starting an engine of a hybrid vehicle. In one example, the hybrid vehicle may include an engine of the type that is shown in FIG. 1. The hybrid vehicle be arranged in a power split configuration as shown in FIG. 2, a serial configuration, or a parallel configuration. The hybrid vehicle may operate according to the method of FIGS. 4-6 as shown in the sequence of FIG. 3. The hybrid vehicle may adjust thresholds for automatic engine starting according to the method of FIGS. 4-6.

An engine of a hybrid vehicle may be automatically started (e.g., started in response to vehicle operating conditions and not started in response to a human or automated driver engine start request) during periods of higher driver demand and low battery state of charge (SOC). There may be different reasons for higher driver demand including but not limited to higher road loads, higher vehicle loading, and aggressive driver behavior. In some examples, the higher driver demand that is due to aggressive driver behavior may not be sustained for a longer period of time because it may cause vehicle speed to increase to a higher speed than the vehicle driver desires. For example, some aggressive drivers may have a tendency to input a large driver demand for a short period of time followed by a large decrease in driver demand. This may cause the engine to start and then stop shortly afterwards. However, if the driver may have more gradually increased driver demand, the vehicle speed may have increased at a reasonable rate without having to start the engine.

In one example, the above issue may be addressed by a method for operating a vehicle, comprising: adjusting one or more automatic engine starting thresholds in response to a plurality of low benefit engine starts.

By adjusting automatic engine starting thresholds in response to a plurality of low benefit engine starts, it may be possible to reduce a possibility of generating low benefit engine starts. For example, a threshold amount of time that a driver demand torque is greater than a threshold amount of torque before an internal combustion engine is automatically started may be increased so that the internal combustion engine may be automatically started less frequently due to quick application and withdraw of driver demand torque.

The approach described herein may have several advantages. In particular, the approach may reduce frequency of low benefit engine starts. Further, the approach may reduce fuel consumption and engine starting busyness. In addition, the approach is adaptable to different vehicle drivers.

Referring to FIG. 1, an internal combustion engine 10 is shown. Engine 10 may be included in a drivetrain of a vehicle 100 configured for on-road propulsion, such as the powertrain of FIG. 2. In one example, vehicle 100 is a hybrid electric vehicle.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a drive connection or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into combustion chamber 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In further embodiments, fuel may be delivered into an intake port leading to combustion chamber 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbo-charger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by foot 132; a position sensor 154 coupled to vehicle slowing pedal 150 for sensing force applied by foot 152, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. The driver demand pedal and vehicle slowing pedal may be combined for example in a pivoting setup to select either increasing vehicle speed or decreasing vehicle speed. Further, the driver demand pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may also receive operator input via a transmission lever or shift selector 136. Shift selector 136 may be manually shifted between different gear options by the vehicle operator based on a desired transmission output and a desired direction of vehicle motion. In one example, as depicted, the operator may have the following operator selectable options: park (P), reverse (R), neutral (N), and drive (D). In the depicted example, the shift selector is known as a PRNDL lever, corresponding to the different options. In one example, when in park or neutral, substantially no torque may be transmitted from the engine or an electric machine to the transmission output. When in park, the vehicle is immobile. In drive, an electronic controller can control the transmission to propel the vehicle in a forward direction. In reverse, a single the controller enables the vehicle to move in a backward or reverse direction. Shift selector 136 may be located on a steering column or between driver and passenger positions of the vehicle. In addition, the transmission may be configures as shown in more detail in FIG. 2.

The controller 12 receives signals from the various sensors of FIG. 1 and employs the various actuators of FIG. 1, such as throttle 62, fuel injector 66, spark plug 92, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 depicts an example propulsion system 200 for vehicle 100. In the depicted embodiment, the vehicle is a hybrid electric vehicle (HEV). Propulsion system 200 includes an internal combustion engine 10 (such as engine 10 of FIG. 1) having a plurality of combustion chamber 30. Fuel may be provided to each cylinder of engine 10 from a fuel system (not shown) including one or more fuel tanks, one or more fuel pumps, and fuel injectors 66. Front 202 leads vehicle 100 when vehicle 100 moves in a forward direction 203. Rear 204 leads vehicle 100 when vehicle 100 moves in a reverse direction 205.

Engine 10 delivers power to transmission 157 via torque input shaft 18. In the depicted example, transmission 157 is a power-split transmission (or transaxle) that includes a planetary gear set 22 and one or more rotating gear elements. Transmission 157 further includes a first electric machine 24 (EM1) and a second electric machine 26 (EM2). The first electric machine 24 and the second electric machine 26 may operate as either a motor or a generator. Torque is output from transmission 157, for propelling vehicle tractions wheels 155, via a power transfer gearing 34, a torque output shaft 19, and an axle 288. Axle 288 is shown as a rear axle, but in some examples it may be a front axle. Axle 288 may include a differential assembly 236, right half shaft 287, and left half shaft 289.

First electric machine 24 is drivably connected to second electric machine 26 such that each of first electric machine 24 and second electric machine 26 may be operated using electric energy from an electrical energy storage device, herein depicted as battery 158. In some embodiments, an energy conversion device, such as an inverter, may be coupled between the battery and the motor to convert the DC output of the battery into an AC output for use by an electric machine. However, in alternate embodiments, the inverter may be configured in the electric machine. Due to the mechanical properties of the planetary gear set, first electric machine 24 may be driven by a power output element (on an output side) of the planetary gear set 22 via mechanical connection 232, as further elaborated below.

Second electric machine 26 may be operated in a regenerative mode, that is, as a generator, to absorb energy from vehicle motion and/or the engine and convert the absorbed kinetic energy to an energy form suitable for storage in battery 158. Furthermore, second electric machine 26 may be operated as a motor or generator, as required, to augment or absorb torque provided by the engine, such as during a transition of engine 10 between different combustion modes (e.g., during transitions between a spark ignition mode and a compression ignition mode).

Planetary gear set 22 comprises a ring gear 142, a sun gear 143, and a planetary carrier assembly 146. The ring gear and sun gear may be coupled to each other via the carrier assembly 146. The carrier assembly 146 may include planet pinion gears 147 and a carrier to support the planet pinion gears. The carrier assembly 146 is directly coupled to engine 10 without an intervening sun gear or ring gear. The sun gear 143 is directly coupled to the first electric machine 24 without intervening carrier assembly 146 or ring gear 142. Ring gear 142 is directly coupled to power transfer gearing 34, and transfer gearing 34 is coupled to vehicle traction wheels 155. The power transfer gearing 34 may include one or more meshing gear elements 260-268. Second electric machine 26 may drive gear elements 270, which acts as a torque input for the gear elements 260-268. In this way, the ring gear 142 (and consequently the engine and first electric machine) may be coupled to the vehicle wheels and the motor via one or more gear elements. An operator may select a transmission mode via actuation of shift selector 136, as discussed at FIG. 1.

Controller 12 may command and control first electric machine 24 and second electric machine 26 as well as engine 10, battery 158, and friction pads 291. In some examples, controller 12 may be embodied as two or more controllers. Controller 12 may be configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. Input may also be received via the shift selector 136, a vehicle slowing pedal, a driver demand pedal, a vehicle speed sensor, and the other sensors of FIG. 1. The various actuators may include, for example, the gear set, cylinder fuel injectors (not shown), an air intake throttle coupled to the engine intake manifold (not shown), and the actuators of FIG. 1. Controller 12 may receive input data from the various sensors, process the input data, and trigger the actuators in response to the processed input data based on instruction or code programmed therein corresponding to one or more control routines.

For example, a frictional force may be applied to wheels 155 by engaging friction pads 291 to slow vehicle 100. In one example, friction pads 291 may be engaged in response to the driver pressing their foot on a vehicle slowing pedal (not shown). A friction pad control module of the controller 12 may adjust the torque applied to the wheels via the friction pads in concert with an engine retarding torque from engine 10 and/or a negative motor torque (e.g., a torque that opposes motor rotation) from second electric machine 26 in order to apply a net amount of torque on the wheels that slow the vehicle's forward motion at a target rate of vehicle speed reduction. In the same way, the frictional force may be reduced to wheels 155 by disengaging friction pads 291 in response to the driver releasing their foot from a vehicle slowing pedal, or the vehicle forward speed falling below a threshold.

Vehicle 100 may be operated in at least four different operating modes. The four operating modes include a forward electric vehicle mode, a reverse electric vehicle mode, a range extending forward mode, and an engine cranking mode. In these four modes, the vehicle 100 may be driven by solely the engine 10, the engine 10 and the first and/or second electric machines cooperatively, or solely the electric machines, or a combination.

For example, the vehicle may be driven in a first forward electric vehicle mode, wherein engine 10 is not rotated and either or both of the first electric machine 24 and second electric machine 26 provide propulsive effort to drive vehicle 100 in a forward direction. In a reverse electric vehicle mode, engine 10 is not rotated and either or both of the first electric machine 24 and the second electric machine 26 provide propulsive effort to propel vehicle 100 in a reverse direction. In a range extending mode, engine 10 rotates and it provides torque to propulsion system 200 to propel vehicle 100, and/or charge battery 158, and/or transfer electric power from first electric machine 24 to second electric machine 26 or vice-versa. In engine cranking mode, first electric machine rotates engine 10 while vehicle 100 remains stationary. The second electric machine holds ring gear 142 from rotating.

Thus, the system of FIGS. 1 and 2 provides for a vehicle system, comprising: an electric machine; an internal combustion engine; and a controller including executable instructions that cause the controller to adjust one or more automatic engine starting thresholds in response to a behavior classification of a human vehicle driver that has been characterized as being aggressive. In a first example, the vehicle system includes where the behavior classification is based on a rate of position change of a pedal. In a second example that may include the first example, the vehicle system includes where the behavior classification is based on a rate of speed change of a pedal. In a third example that may include one or both of the first and second examples, the vehicle system includes where the behavior classification is based on a frequency of change of driver demand being greater than a threshold. In a fourth example that may include one or more of the first through third examples, the vehicle system includes where the behavior classification is based on pedal movement. In a fifth example that may include one or more of the first through fourth examples, the vehicle system includes where one of the one or more automatic engine starting thresholds is an estimated amount of work performed via the internal combustion engine. In a sixth example that may include one or more of the first through fifth examples, the vehicle system further comprises additional executable instructions to start the internal combustion engine in response to the one or more automatic engine starting thresholds being exceeded. In a seventh example that may include one or more of the first through sixth examples, the vehicle system further comprises additional executable instructions to adjust the one or more automatic engine starting thresholds in response to a plurality of low benefit engine starts.

Referring now to FIG. 3, an example vehicle operating sequence is shown. The vehicle operating sequence of FIG. 3 may be provided via the vehicle of FIGS. 1 and 2 in combination with the method of FIGS. 4-6. The plots are aligned in time. The vertical lines at times t0-t2 represent times of interest during the sequence.

The first plot from the top of FIG. 3 is a plot of a ratio between an actual total number of low benefit engine starts to an actual total number of engine starts that were based on driver demand for a particular vehicle human driver during a predetermined interval versus time. The vertical axis represents the ratio between an actual total number of low benefit engine starts to an actual total number of engine starts that were based on driver demand for a particular vehicle human driver during a predetermined interval. The horizontal axis represents time and time increases from the left side of the plot to the right side of the plot. Trace 302 represents the ratio between an actual total number of low benefit engine starts to an actual total number of engine starts that were based on driver demand for a particular vehicle human driver during a predetermined interval. Horizontal line 350 represents a threshold to be exceeded to adjust automatic engine starting thresholds.

The second plot from the top of FIG. 3 is a plot of an actual total number of engine starts that were based on driver demand for a particular vehicle human driver during a predetermined interval versus time. The vertical axis represents the actual total number of engine starts that were based on driver demand for a particular vehicle human driver during a predetermined interval. The horizontal axis represents time and time increases from the left side of the plot to the right side of the plot. Trace 304 represents the actual total number of engine starts that were based on driver demand for a particular vehicle human driver during a predetermined interval. Horizontal line 352 represents a threshold to be exceeded to adjust automatic engine starting thresholds.

The third plot from the top of FIG. 3 is a plot of a driver demand torque or power threshold for initiating automatic engine starting versus time. The vertical axis represents a driver demand torque or power threshold for initiating automatic engine starting. The horizontal axis represents time and time increases from the left side of the plot to the right side of the plot. Trace 306 represents the driver demand torque or power threshold for initiating automatic engine starting and the amount of the driver demand torque or power threshold increases in the direction of the vertical axis arrow. Automatic engine starting may be initiated when driver demand torque or power exceeds the threshold that is represented by trace 306.

The fourth plot from the top of FIG. 3 is a plot of an amount of time driver demand exceeds a threshold driver demand for initiating automatic engine starting threshold versus time. The vertical axis represents the amount of time driver demand exceeds the threshold driver demand for initiating automatic engine starting. The horizontal axis represents time and time increases from the left side of the plot to the right side of the plot. Trace 306 represents the amount of time driver demand exceeds a threshold driver demand for initiating automatic engine starting. Automatic engine starting may be initiated when the amount of time driver demand torque or power exceeds the threshold that is represented by trace 308.

The fifth plot from the top of FIG. 3 is a plot of a driver demand filter smoothing factor versus time. The vertical axis represents the driver demand filter smoothing factor value and the driver demand filter smoothing factor value increases in the direction of the vertical axis arrow. The horizontal axis represents time and time increases from the left side of the plot to the right side of the plot. Trace 310 represents the driver demand smoothing factor value. In one example, the smoothing factor may be applied via a first order filter expressed as: $y_i = \alpha x_i + (1-\alpha)y_{(i-1)}$, where $\alpha$ is the smoothing factor, x is input to the filter, y is output from the filter, and i is the data point sample number.

At time t0, the ratio between the actual total number of low benefit engine starts to actual total number of engine starts that were based on driver demand for a particular vehicle driver is low and the actual total number of engine starts that were based on driver demand for the particular vehicle driver is also low. The driver demand torque or power threshold for initiating automatic engine starting, the amount of time driver demand exceeds a threshold driver demand for initiating automatic engine starting, and the driver demand filter smoothing factor are at medium levels.

At time t1, the ratio between the actual total number of low benefit engine starts to actual total number of engine starts that were based on driver demand for a particular vehicle driver has increased, but it remains below threshold 350 so adjustments to the driver demand torque or power threshold for initiating automatic engine starting, the amount of time driver demand exceeds a threshold driver demand for initiating automatic engine starting threshold, and the driver demand filter smoothing factor are not made. The actual total number of engine starts that were based on driver demand for the particular vehicle driver has increased and it now exceeds threshold 352. Therefore, the actual total number of engine starts that were based on driver demand for the particular vehicle driver are not preventing adjustments to the driver demand torque or power threshold for initiating automatic engine starting, the amount of time driver demand exceeds a threshold driver demand for initiating automatic engine starting threshold, and the driver demand filter smoothing factor.

At time t2, the ratio between the actual total number of low benefit engine starts to actual total number of engine starts that were based on driver demand for a particular vehicle driver has increased, and it is now greater than threshold 350 so adjustments to the driver demand torque or power threshold for initiating automatic engine starting, the amount of time driver demand exceeds a threshold driver demand for initiating automatic engine starting threshold, and the driver demand filter smoothing factor are made. The actual total number of engine starts that were based on driver demand for the particular vehicle driver remain above threshold 352. As such, the driver demand torque or power threshold for initiating automatic engine starting is increased, the amount of time driver demand exceeds a threshold driver demand for initiating automatic engine starting threshold is increased, and the driver demand filter smoothing factor is increased. These adjustments may operate to reduce a possibility of automatic engine starting.

Figure 4:
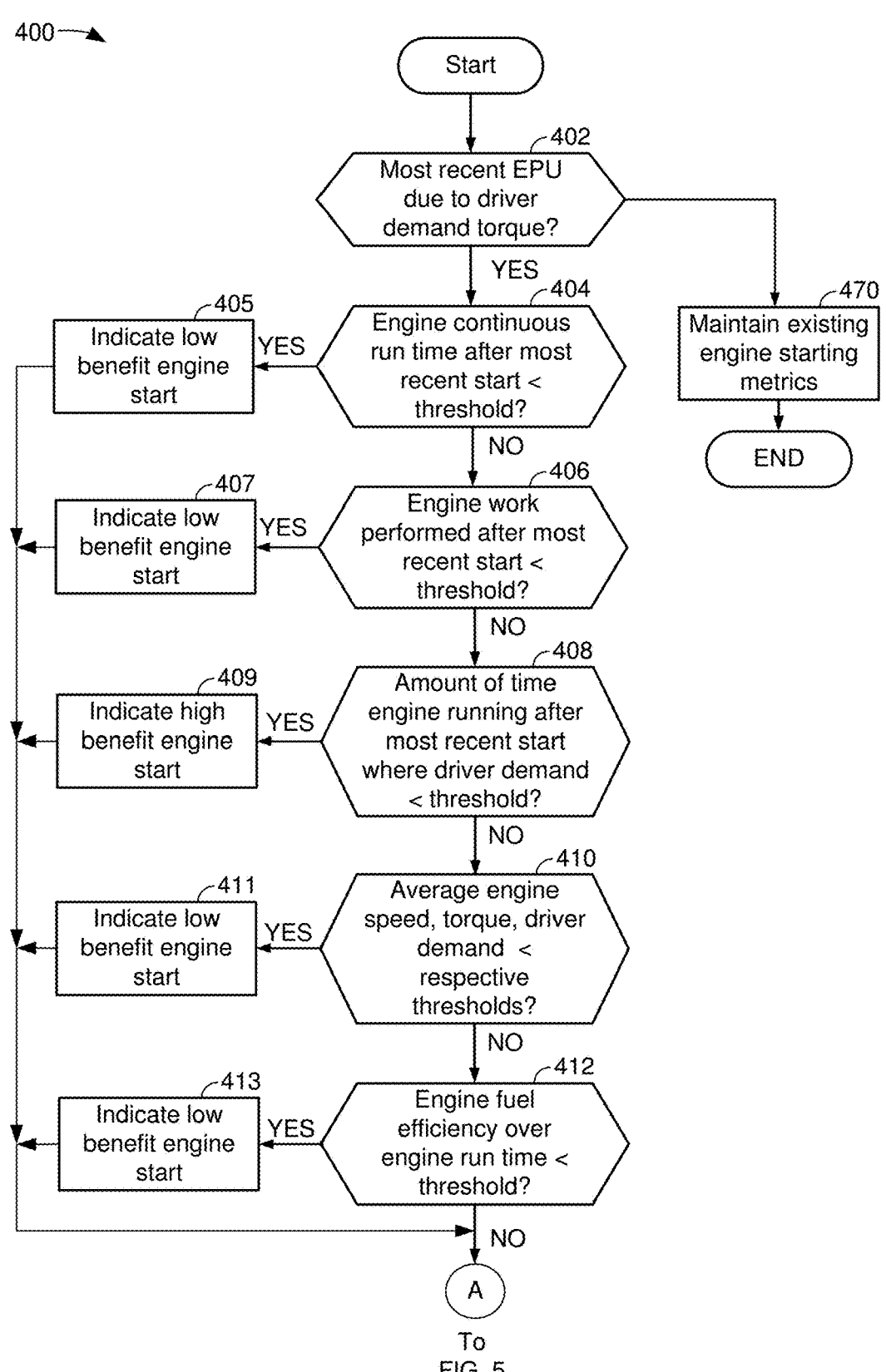
FIGS. 4-6 show a method for operating a hybrid vehicle.
Figure 5:
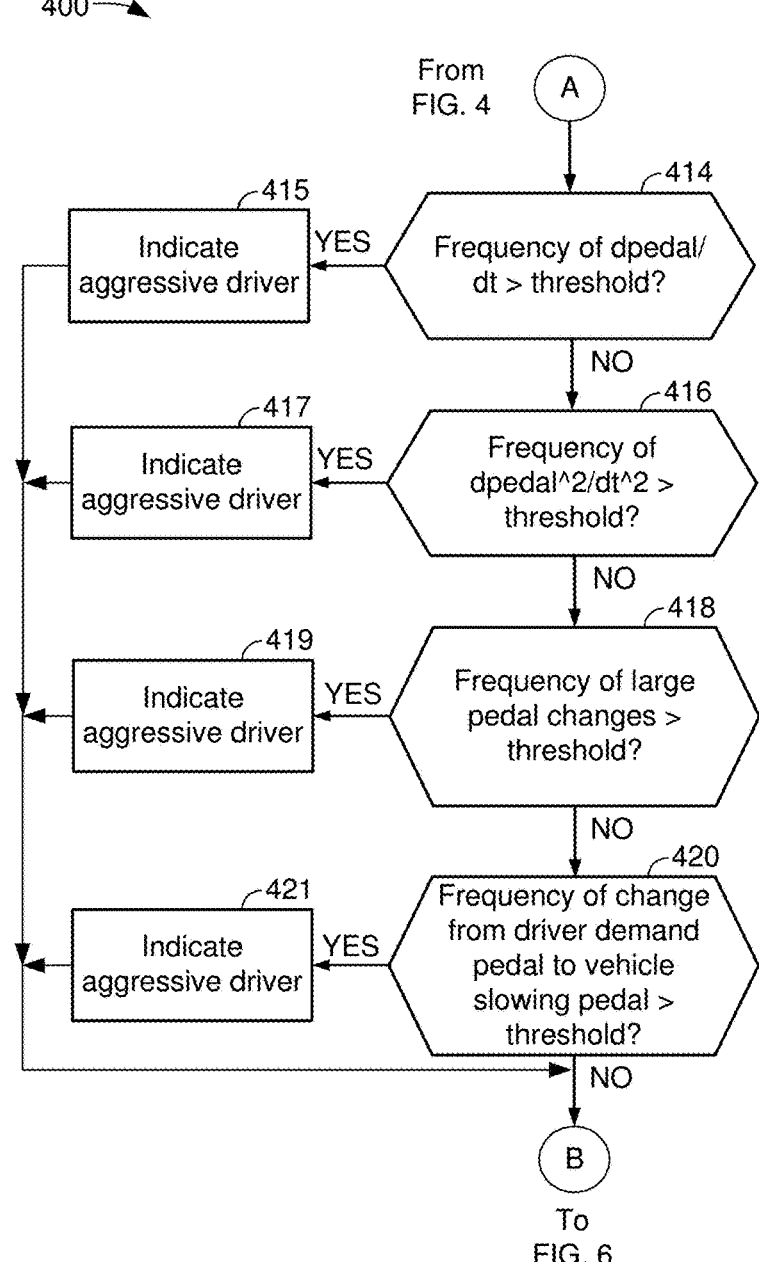
Figure 6:
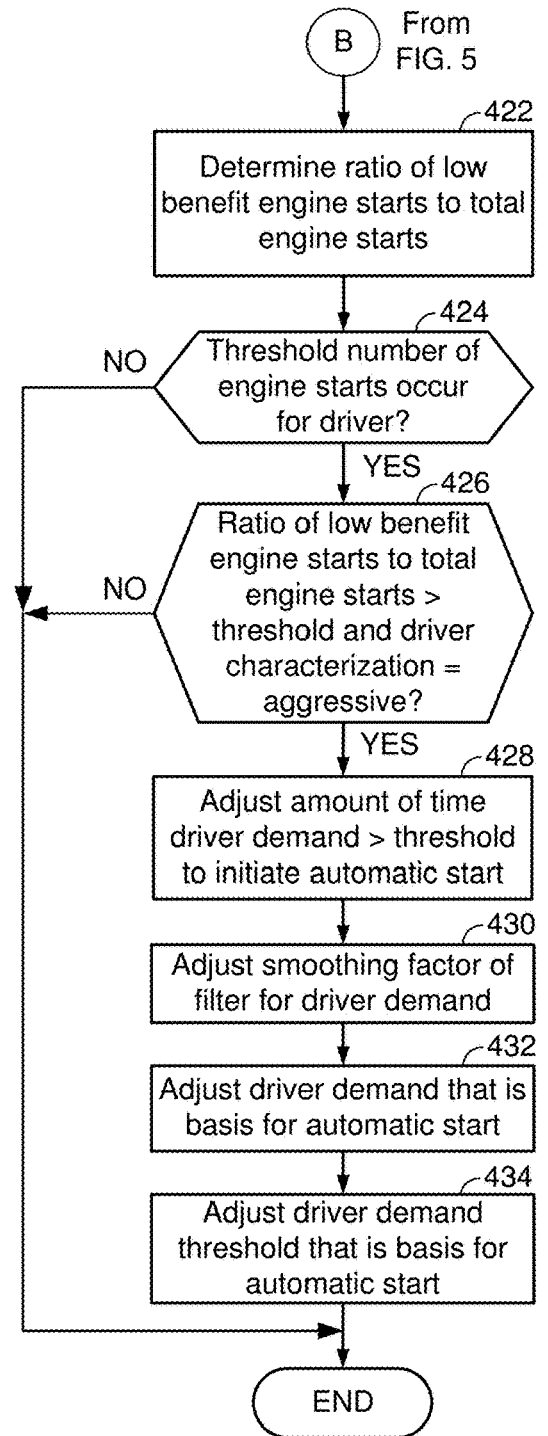

Moving on to FIGS. 4-6, a method for operating a hybrid vehicle is shown. In particular, the method of FIGS. 4-6 may be incorporated into the system of FIGS. 1 and 2 as executable instructions stored in controller non-transitory memory. In addition, other portions of method 400 may be performed via a controller transforming operating states of devices and actuators in the physical world. The controller may employ engine actuators of the engine system to adjust engine operation.

At 402, method 400 judges whether or not a most recent automatic engine start (e.g., an engine start that was initiated via a controller without a vehicle driver or occupant specifically requesting starting of the internal combustion engine) was in response to a driver demand level. If so, the answer is yes and method 400 proceeds to 404. Otherwise, the answer is no and method 400 proceeds to 470.

At 470, method 400 maintains thresholds and/or parameters for automatic engine starting at their existing levels or values. Method 400 proceeds to exit.

At 404, method 400 judges whether or not after the most recent automatic engine start, the engine has had a continuous run time (e.g., rotating the engine and combusting fuel without stopping the engine) that is less than a threshold amount of time over a predetermined time interval. If so, the answer is yes and method 400 proceeds to 405. If not, the answer is no and method 400 proceeds to 406. A short duration of engine run time over a predetermined amount of time may be indicative of lack of actual necessity to utilize engine output.

At 405, method 400 indicates that the most recent automatic engine start was a low benefit engine start and increments a counter that holds the actual total number of low benefit engine starts for the present vehicle driver. Method 400 proceeds to 414.

At 406, method 400 judges whether or not after the most recent automatic engine start, the engine has performed an amount of work propelling the vehicle and/or charging a traction battery that is less than a threshold amount of work during a predetermined time interval. If so, the answer is yes and method 400 proceeds to 407. If not, the answer is no and method 400 proceeds to 408. An engine performing a small amount of work during a predetermined amount of time may be indicative of a lack of necessity to utilize engine output.

At 407, method 400 indicates that the most recent automatic engine start was a low benefit engine start and increments the counter that holds the actual total number of low benefit engine starts for the present vehicle driver. Method 400 proceeds to 414.

At 408, method 400 judges whether or not after the most recent automatic engine start, an amount of time that driver demand has exceeded a threshold driver demand is less than a threshold amount of time. If so, the answer is yes and method 400 proceeds to 409. If not, the answer is no and method 400 proceeds to 410. A short time duration for driver demand exceeding a threshold may be indicative of engine output being used in an inefficient manner.

At 409, method 400 indicates that the most recent automatic engine start was a low benefit engine start and increments the counter that holds the actual total number of low benefit engine starts for the present vehicle driver. Method 400 proceeds to 414.

At 410, method 400 judges whether or not after the most recent automatic engine start, the average engine speed is less than a threshold speed, the average engine torque is less than a threshold torque, and the average driver demand is less than a threshold driver demand over a predetermined time duration. If so, the answer is yes and method 400 proceeds to 412. If not, the answer is no and method 400 proceeds to 411. Low engine speed and low engine torque may be indicative of inefficient engine operation.

At 411, method 400 indicates that the most recent automatic engine start was a low benefit engine start and increments the counter that holds the actual total number of low benefit engine starts for the present vehicle driver. Method 400 proceeds to 414.

At 412, method 400 judges whether or not after the most recent automatic engine start, the engine fuel efficiency is less than a threshold efficiency over a predetermined time interval. If so, the answer is yes and method 400 proceeds to 413. If not, the answer is no and method 400 proceeds to 414.

At 413, method 400 indicates that the most recent automatic engine start was a low benefit engine start and increments a counter that holds the actual total number of low benefit engine starts for the present vehicle driver. Method 400 proceeds to 414.

At 414, method 400 judges whether or not after the most recent automatic engine start, the frequency of pedal (e.g., driver demand pedal or vehicle slowing pedal) application rate of position change is greater than a threshold rate of position change. If so, the answer is yes and method 400 proceeds to 415. If not, the answer is no and method 400 proceeds to 416.

At 415, method 400 indicates that the vehicle was operated by a driver that is characterized as "aggressive" following the most recent automatic engine start. Method 400 proceeds to 422.

At 416, method 400 judges whether or not after the most recent automatic engine start, the frequency of pedal application rate of speed change is greater than a threshold rate of speed change. If so, the answer is yes and method 400 proceeds to 417. If not, the answer is no and method 400 proceeds to 418.

At 417, method 400 indicates that the vehicle was operated by a driver that is characterized as "aggressive" following the most recent automatic engine start. Method 400 proceeds to 422.

At 418, method 400 judges whether or not after the most recent automatic engine start, the frequency of pedal application rate of position changes of magnitudes that are greater than a threshold is greater than a threshold frequency. If so, the answer is yes and method 400 proceeds to 419. If not, the answer is no and method 400 proceeds to 420. In one example, method 400 may determine the frequency of pedal change and frequency of pedal change being greater than a threshold magnitude via applying a Fourier transform to the pedal position signal.

At 419, method 400 indicates that the vehicle was operated by a driver that is characterized as "aggressive" following the most recent automatic engine start. Method 400 proceeds to 422.

At 420, method 400 judges whether or not after the most recent automatic engine start, the frequency of the human driver switching from driver demand pedal to vehicle slowing pedal or vice-versa is greater than a threshold rate of change. If so, the answer is yes and method 400 proceeds to 421. If not, the answer is no and method 400 proceeds to 422.

At 421, method 400 indicates that the vehicle was operated by a human or autonomous driver that is characterized as "aggressive" following the most recent automatic engine start. Method 400 proceeds to 422.

At 422, method 400 determines a ratio of an actual total number of low benefit engine starts to an actual total number of engine starts for a particular human or autonomous driver of the vehicle. The ratio may be expressed as: ATNLBES/ATNES, where ATNLBES is the actual total number of low benefit engine starts, and ATNES is the actual total number of engine starts, where the engine starts were automatic engine starts that were performed based on driver demand. Method 400 proceeds to 424.

At 424, method 400 judges if a threshold number of automatic engine starts were performed for the particular driver and based on driver demand. If so, the answer is yes and method 400 proceeds to 426. Otherwise, the answer is no and method 400 proceeds to exit.

At 426, method 400 judges if the ratio determined at 422 is greater than a threshold amount and if the vehicle's human driver or autonomous driver has been characterized as aggressive after past engine starts that were generated based on driver demand torque or power. If so, the answer is yes and method 400 proceeds to 428. Otherwise, the answer is no and method 400 proceeds to exit.

At 428, method 400 adjusts a first automatic engine starting threshold. The first automatic engine starting threshold is a threshold amount of time that driver demand exceeds a threshold value before the engine may be automatically started. For example, if the initial threshold amount of time is 1.5 seconds for driver demand to exceed 160 Newton-meters, the engine may be automatically started if driver demand torque exceeds 160 Newton-meters for longer than 1.5 seconds. The initial threshold amount of time may be raised a predetermined amount (e.g., 0.4 seconds), or alternatively, by an amount that is interpolated according to vehicle operating conditions, in response to the conditions at steps 424 and 426 being met. Method 400 proceeds to 430.

At 430, method 400 adjusts a smoothing factor for driver demand. The smoothing factor value may be increased from an initial value to a new value that increases a time response of the driver demand torque or power. For example, an initial smoothing factor value may allow a filtered driver demand torque value to reach a value as a step change in driver demand torque in 0.2 seconds. An increased smoothing factor may allow the filtered driver demand torque to reach the same step change in driver demand torque in 0.3 seconds. By adjusting the smoothing factor, or alternatively a time constant of a filter, changes in driver demand may be attenuated so that they may have less tendency to cause an automatic engine start. Method 400 proceeds to 432.

At 432, method 400 adjusts driver demand that is a basis for automatic engine starting. In one example, method 400 adjusts a scaling of driver demand pedal position to driver demand power or torque. In particular, method 400 lowers a driver demand power or torque for a particular driver demand pedal position. Method 400 may adjust driver demand power or torque for a plurality of driver demand pedal positions so that an increase in driver demand pedal position increases driver demand less for at least a portion of the driver demand pedal range. Method 400 proceeds to 434.

At 434, method 400 adjusts a second automatic engine starting threshold. The second automatic engine starting threshold is a threshold amount of driver demand torque or power that has to be exceeded to initiate an automatic engine start. For example, if the initial threshold amount of driver demand torque is 160 Newton-meters, the engine may be initially automatically started if driver demand torque exceeds 160 Newton-meters. The initial threshold amount of driver demand torque or power may be raised a predetermined amount (e.g., 20 Newton-meters), or alternatively, by an amount that is interpolated according to vehicle operating conditions, in response to the conditions at steps 424 and 426 being met. Method 400 proceeds to exit.

The engine may be automatically started based on the newly adjust thresholds and parameters after the thresholds and parameters have been revised or adapted according to driver classification and engine starting classification.

In this way, method 400 may adapt automatic engine starting thresholds and parameters so that there may be less tendency to automatically start an engine of a vehicle that is being driven by a human vehicle driver that has been classified as "aggressive." This may increase vehicle fuel economy and reduce vehicle emissions.

Thus, the method of FIGS. 4-6 provides for a method for operating a vehicle, comprising: adjusting one or more automatic engine starting thresholds in response to a plurality of low benefit engine starts. In a first example, the method includes wherein the one or more automatic engine starting thresholds includes a threshold amount of time that driver demand exceeds a threshold driver demand. In a second example that may include the first example, the method includes wherein the threshold driver demand is included in the one or more automatic engine starting thresholds. In a third example that may include one or both of the first and second examples, the method further comprises adjusting driver demand as a function of driver demand pedal position in response to the plurality of low benefit engine starts. In a fourth example that may include one or more of the first through third examples, the method further comprises a time constant of a filter applied to driver demand torque or power in response to the plurality of low benefit engine starts. In a fifth example that may include one or more of the first through fourth examples, the method includes where the low benefit engine starts include starting an engine and stopping the engine before the engine has performed a threshold amount of work propelling the vehicle or charging a traction battery of the vehicle. In a sixth example that may include one or more of the first through fifth examples, the method includes where the low benefit engine starts include and amount of time after an engine start that an engine was running at greater than a threshold driver demand torque or power being less than a threshold amount of time.

The method of FIGS. 4-6 also provides for a method for operating a vehicle, comprising: adjusting one or more automatic engine starting thresholds in response to a plurality of low benefit engine starts and a behavior classification of a human vehicle driver that has been characterized as being aggressive. In a first example, the method further comprises not including engine starts that are not based on driver demand in the plurality of low benefit engine starts. In a second example that may include the first example, the method includes where the adjusting is based on an actual total number of low benefit engine starts being divided by a total number of engine starts or a probability of generating a low benefit engine start as determined from prior engine starts. In a third example that may include one or both of the first and second examples, the method includes where the plurality of low benefit engine starts are based on the human vehicle driver and not on a second human vehicle driver. In a fourth example that may include one or more of the first through third examples, the method includes where adjusting one or more automatic engine starting thresholds includes raising an automatic engine starting threshold such that automatic engine starting frequency is lowered.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
adjusting one or more automatic engine starting thresholds in response to a plurality of low benefit engine starts, wherein low benefit engine starts are where an engine of the vehicle remains started for less than a threshold amount of time resulting in inefficient engine output.

2. The method of claim 1, wherein the one or more automatic engine starting thresholds includes a threshold amount of time that driver demand exceeds a threshold driver demand before the engine is automatically started.

3. The method of claim 2, wherein the threshold driver demand is included in the one or more automatic engine starting thresholds.

4. The method of claim 1, further comprising adjusting driver demand as a function of driver demand pedal position in response to the plurality of low benefit engine starts.

5. The method of claim 1, further comprising a time constant of a filter applied to driver demand torque or power in response to the plurality of low benefit engine starts.

6. The method of claim 1, where the plurality of low benefit engine starts include starting an engine and stopping the engine before the engine has performed a threshold amount of work propelling the vehicle or charging a traction battery of the vehicle.

7. The method of claim 1, where the plurality of low benefit engine starts include and amount of time after an engine start that an engine was running at greater than a threshold driver demand torque or power being less than a threshold for a calibrated amount of time.

8. A vehicle system, comprising:
an electric machine;
an internal combustion engine; and
a controller including executable instructions that cause the controller to adjust one or more automatic engine starting thresholds to reduce a frequency of automatic engine starts in response to a behavior classification of a human vehicle driver that has been characterized as being aggressive, wherein the human vehicle driver is characterized as being aggressive when a frequency of a rate of position change of a pedal of the vehicle is greater than a threshold rate.

9. The vehicle system of claim 8, where the behavior classification is additionally based on a rate of speed change of the pedal.

10. The vehicle system of claim 8, where the behavior classification is additionally based on a frequency of change of driver demand being greater than a threshold.

11. The vehicle system of claim 8, where the behavior classification is additionally based on pedal movement.

12. The vehicle system of claim 8, where one of the one or more automatic engine starting thresholds is an estimated amount of work performed via the internal combustion engine.

13. The vehicle system of claim 8, further comprising additional executable instructions to start the internal combustion engine in response to the one or more automatic engine starting thresholds being exceeded.

14. The vehicle system of claim 8, further comprising additional executable instructions to adjust the one or more automatic engine starting thresholds in response to a plurality of low benefit engine starts.

15. A method for operating a vehicle, comprising:

adjusting one or more automatic engine starting thresholds in response to a plurality of low benefit engine starts and a behavior classification of a human vehicle driver that has been characterized wherein an engine of the vehicle remains started for less than a threshold amount of time and wherein adjusting one or more automatic engine starting thresholds includes raising an automatic engine starting threshold such that automatic engine starting frequency is lowered.

16. The method of claim 15, further comprising not including engine starts that are not based on driver demand in the plurality of low benefit engine starts.

17. The method of claim 15, where the adjusting is based on probability of performing a low benefit engine start as determined from prior engine starts.

18. The method of claim 15, where the plurality of low benefit engine starts are based on the human vehicle driver and not on a second human vehicle driver.

* * * * *